United States Patent

[11] 3,573,516

| [72] | Inventors | Russell P. Lyon<br>East Lake, N.Y.;<br>Paul W. Koenig, Clyde, N.Y. |
|---|---|---|
| [21] | Appl. No. | 818,681 |
| [22] | Filed | Apr. 23, 1969 |
| [45] | Patented | Apr. 6, 1971 |
| [73] | Assignee | General Electric Company |

[54] RECTIFIER BRIDGE FOR USE WITH AN ALTERNATOR
7 Claims, 14 Drawing Figs.

[52] U.S. Cl. ..................................................... 310/68, 310/71, 317/234
[51] Int. Cl. ....................................................... H02k 11/00
[50] Field of Search........................................... 310/68, 68.4, 71; 321/8, 28, (Inquired); 317/234, (Inquired)

[56] References Cited
UNITED STATES PATENTS

| 3,041,484 | 6/1962 | Freer et al. | 310/68 |
|---|---|---|---|
| 3,198,972 | 8/1965 | Larson | 310/68 |
| 3,209,218 | 9/1965 | Zielaset et al. | 317/234 |
| 3,210,618 | 10/1965 | Rosenberg et al. | 317/234 |
| 3,265,802 | 8/1966 | Hillman et al. | 317/234 |
| 3,356,873 | 12/1967 | Tamm | 310/68 |
| 3,356,914 | 12/1967 | Whigham et al. | 317/234 |
| 3,428,871 | 2/1969 | Scott et al. | 317/234 |
| 3,465,212 | 9/1969 | Grimes et al. | 317/234 |

FOREIGN PATENTS

| 1,052,916 | 12/1966 | Great Britain | 310/68.4 |
|---|---|---|---|
| 1,163,995 | 9/1969 | England | 310/68 |

*Primary Examiner*—Milton O. Hirshfield
*Assistant Examiner*—Mark O. Budd
*Attorneys*—Robert J. Mooney, Nathan J. Cornfeld, Carl O. Thomas, Frank L. Neuhauser, Oscar B. Waddell and Joseph B. Forman

ABSTRACT: A rectifier bridge assembly is mounted against a heat-receiving surface which may be a housing of an alternator. The bridge assembly includes a plurality of stacks each including an input lead located between junction containing semiconductor elements. A plate overlies the stacks in electrically conductive relation thereto to form a conduction path for rectified current. A dielectric surrounds the semiconductor elements to protect them against contamination.

Patented April 6, 1971

INVENTORS:
RUSSELL P. LYON,
PAUL W. KOENIG,

BY Carl O. Thomas
THEIR ATTORNEY.

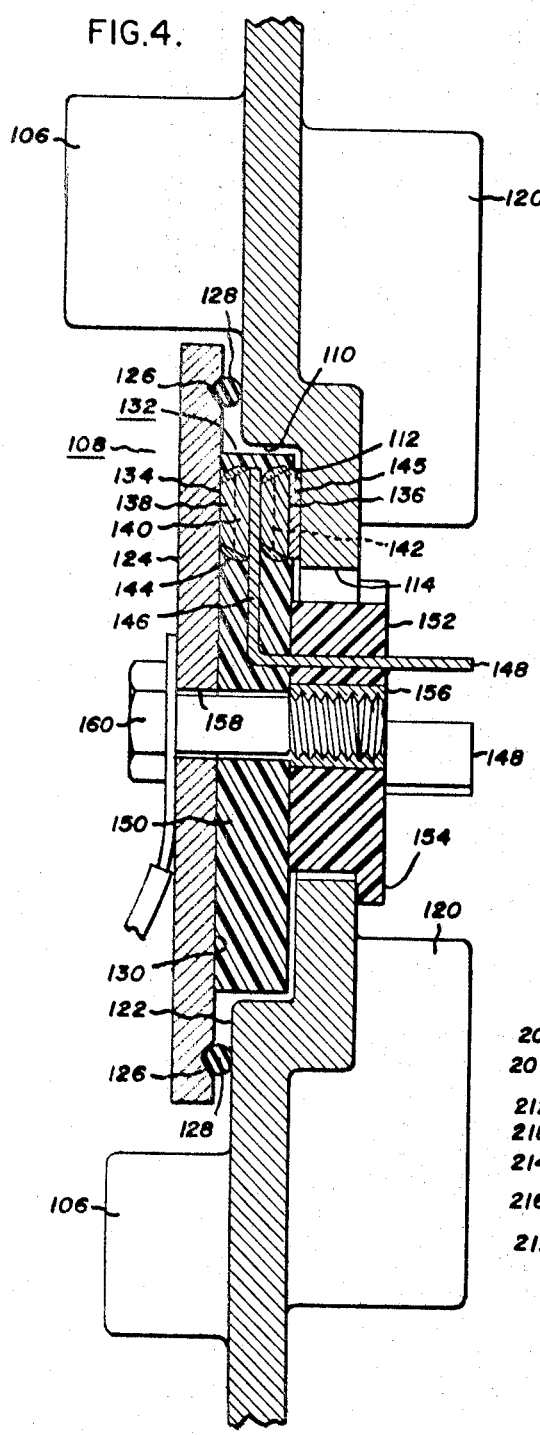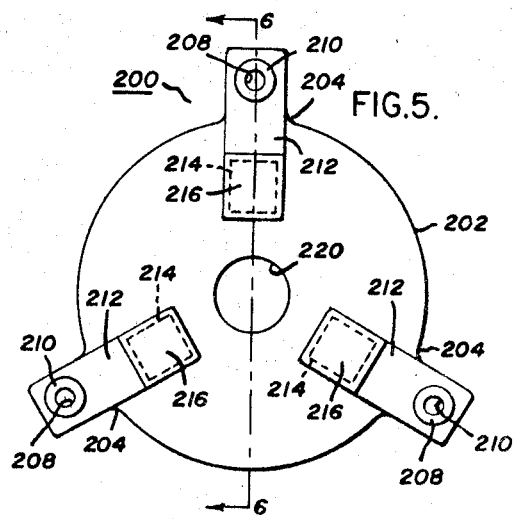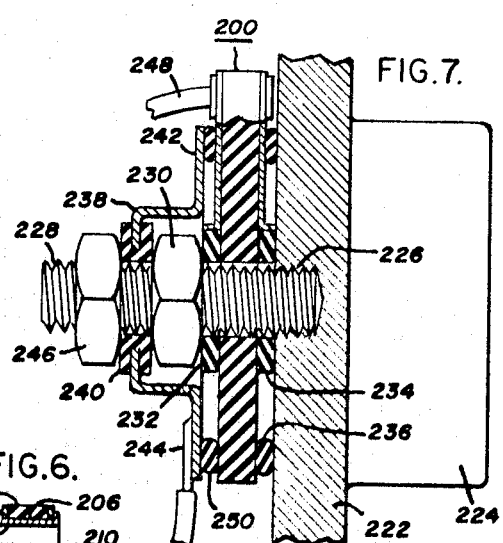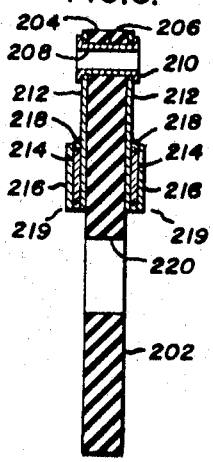
INVENTORS:
RUSSELL P. LYON,
PAUL W. KOENIG,
BY Carl O. Thomas
THEIR ATTORNEY.

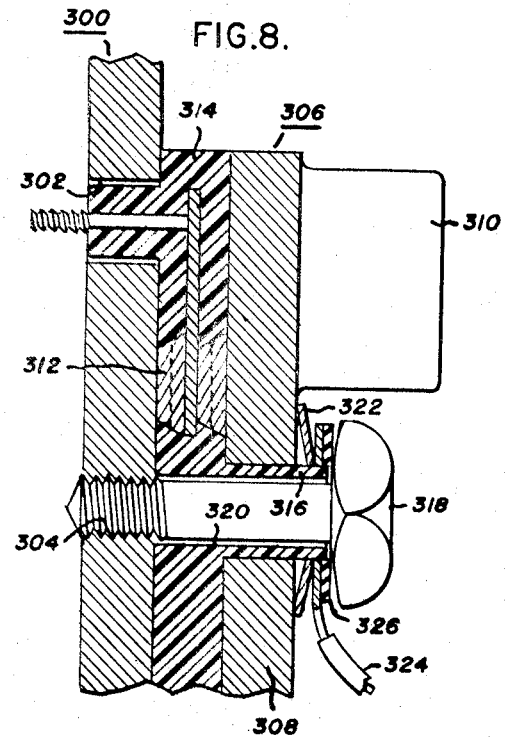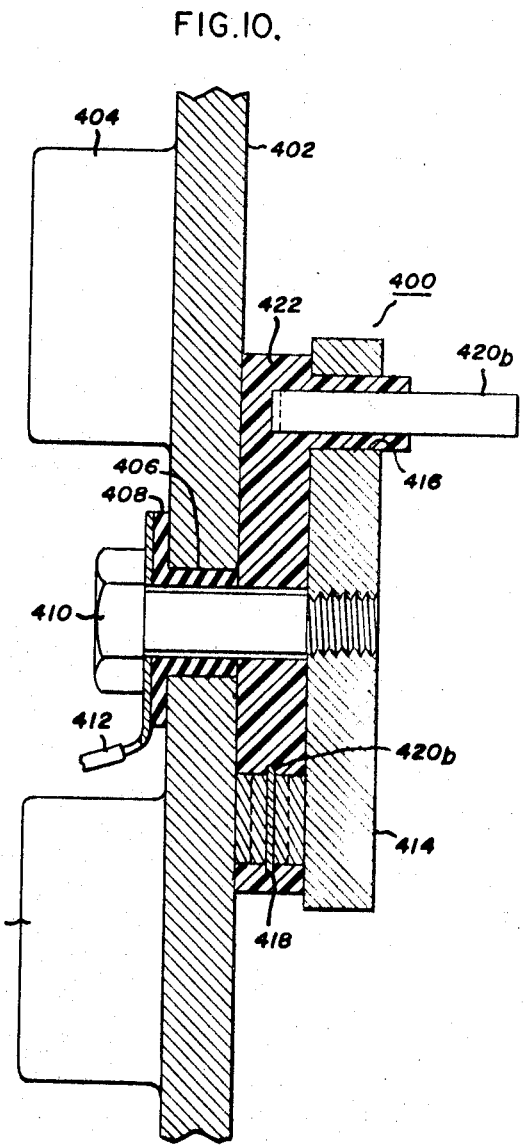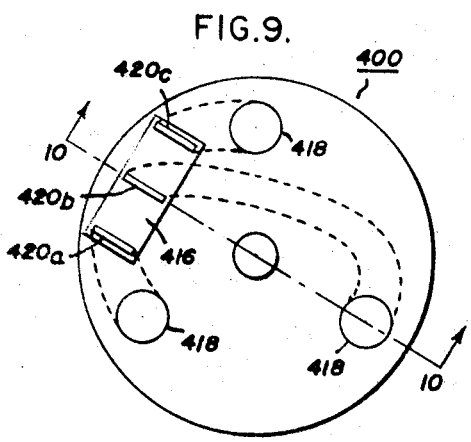

INVENTORS:
RUSSELL P. LYON,
PAUL W. KOENIG,

BY Carl O. Thomas
THEIR ATTORNEY.

RECTIFIER BRIDGE FOR USE WITH AN ALTERNATOR

Our invention relates to a novel bridge arrangement for obtaining a rectified electrical output.

It is conventional practice to utilize with a three-phase alternator, such as is incorporated in an automobile, for example, a rectifier bridge to convert the three-phase alternating current output of the alternator into a rectified form more easily distributed and used. Typically the rectifier bridge and alternator have been independently constructed each to perform its intended function. Accordingly the desired overall electrical function of a rectified electrical output is attained only at the combined cost of both an alternator and a bridge rectifier plus an additional cost to bring the two into association.

It is an object of our invention to provide a rectifier bridge capable of cooperation with an alternator to form a simple, efficient, low cost composite which effectively performs the functions of alternating current generation and rectification with maximum ease of assembly and function sharing.

It is an additional object to provide a rectifier bridge of novel and improved construction.

These and other objects of our invention are accomplished in one aspect by providing the combination comprised of an alternator including an electrically and thermally conductive portion exposed for direct air cooling and output lead means for delivering alternating current. Electrically conductive means are spaced from the thermally conductive portion of the alternator and have a first surface located in spaced parallel relation to a second surface of the conductive portion of the alternator. Means are interposed between the first and second surfaces for providing a separate unidirectionally conductive path from each of the output lead means to each of the first and second surface portions. The interposed means includes means adapted to be associated with each of the lead means for receiving an alternating electrical current therefrom. The first and second semiconductive means are separated by the receiving means. Each of the semiconductive means contains layer portions of opposite conductivity type forming a rectifying junction therebetween. The first semiconductive means associated with each of the receiving means has a first conductivity type layer portion lying in thermally and ohmically conductive relation with the conductive portion of the alternator. The second semiconductive means is associated with each of the receiving means and has an opposite conductivity type layer portion lying in ohmically conductive relation with the first surface of the electrically conductive means. Means are provided peripherally surrounding the semiconductive means for protection thereof, and means electrically isolated from at least one of the first and second surfaces are for mounting the electrically conductive means and the interposed means in assembled relation adjacent the conductive portion of the alternator.

Our invention may be better understood by reference to the following detailed description considered in conjunction with the drawings, in which:

FIG. 4 is a sectional view taken along section line 4—4 in FIG. 2;

FIG. 5 is an elevation of a modified bridge subassembly;

FIG. 6 is a sectional view taken along section line 6—6 in FIG. 5,

FIG. 7 is a sectional view of a rectifier including our modified bridge subassembly in combination with a heat sink;

FIG. 8 is a sectional view of another modified rectifier bridge in combination with a heat sink;

FIG. 9 is a plan view of an additional embodiment of a rectifier bridge according to our invention;

FIG. 10 is a sectional view taken along section line 10—10 in FIG. 9;

Figure 1:
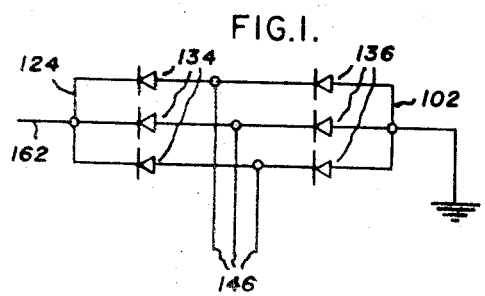
FIG. 1 is a circuit diagram of a three-phase alternating current rectifier bridge.
Figure 3:
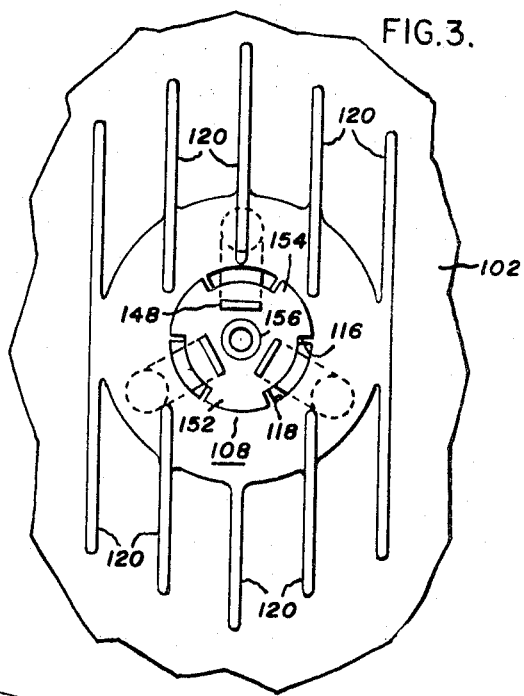
FIG. 3 is an elevation of a rectifier bridge according to our invention with portions of the associated alternator broken away.
Figure 2:
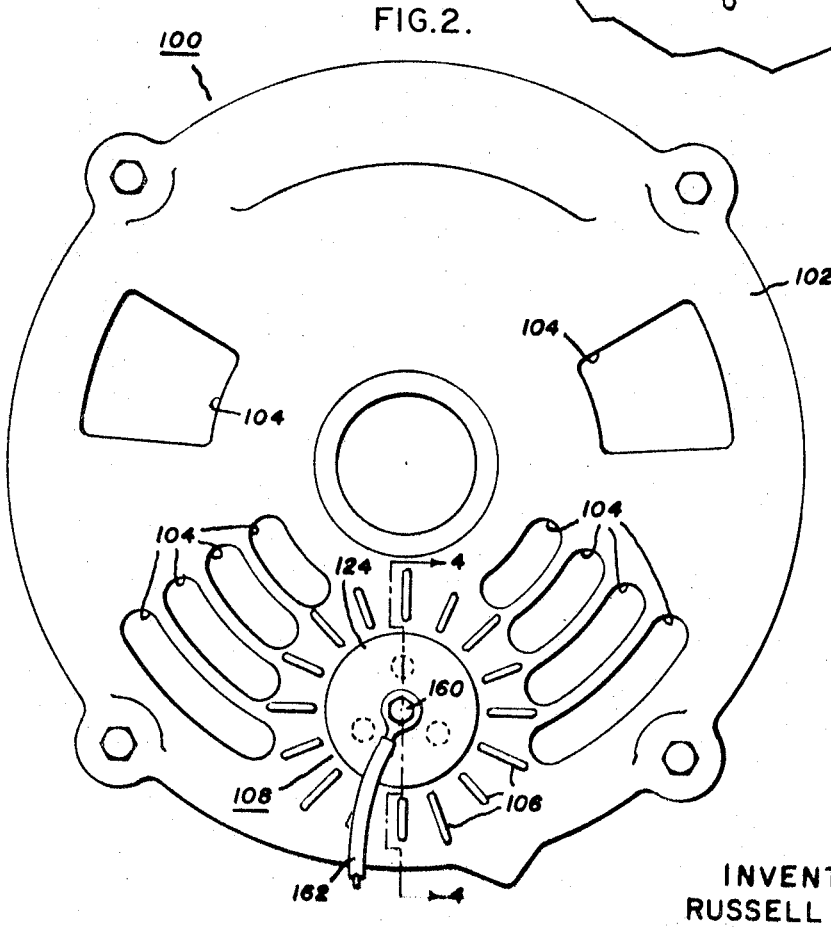
FIG. 2 is an end view of an alternator and rectifier bridge constructed according to our invention.
Figure 11:
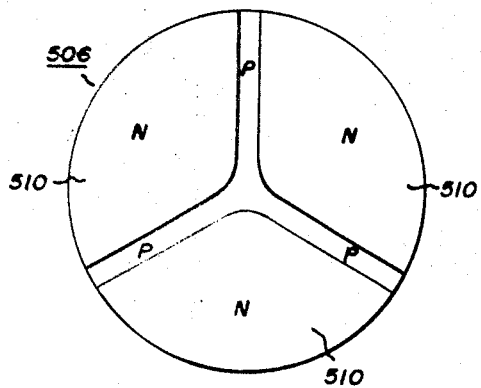
FIGS. 11 and 12 are elevations of semiconductive discs formed according to our invention.
Figure 12:
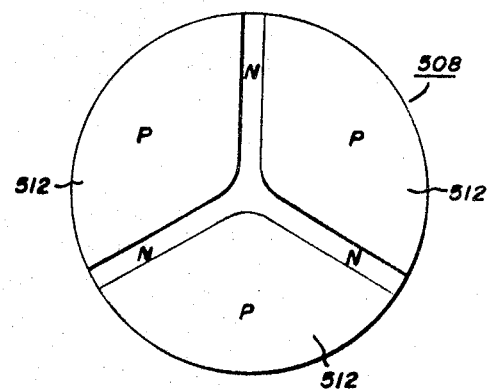
Figure 13:
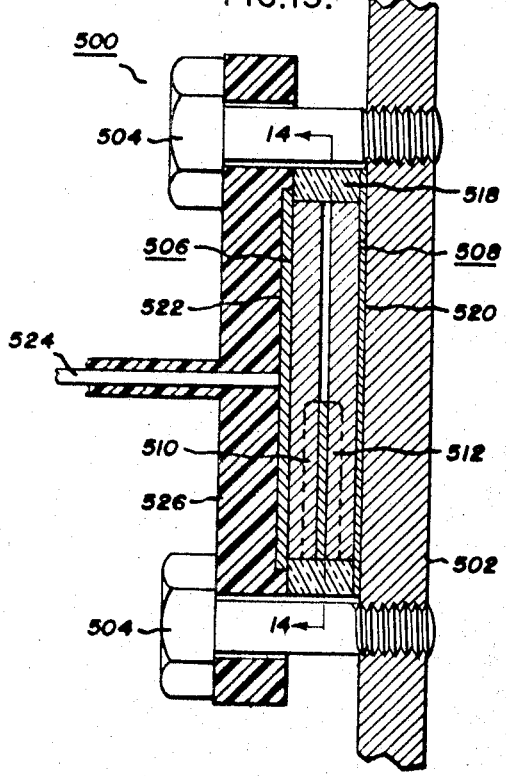
FIG. 13 is a sectional view of a rectifier bridge incorporating the semiconductor discs.
Figure 14:
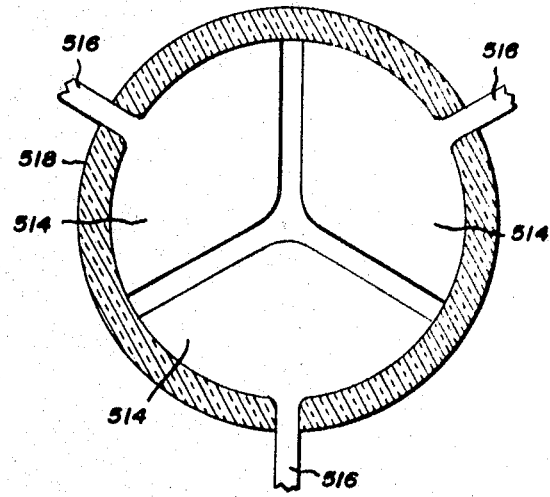
FIG. 14 is a sectional view taken along section line 14—14 in FIG. 13.

Referring initially to FIGS. 1 through 4 inclusive, a three-phase alternator 100 is provided with a housing end bell 102 formed of metal so that it is both thermally and electrically conductive. The housing end bell is provided with a plurality of air circulation ports 104. On the exterior surface of the housing a plurality of heat dissipation fins 106 are provided. Preferably the housing end bell is formed by casting, and the heat dissipation fins are formed integrally with the housing during casting. The housing end bell is provided with a recess 110 having an outer surface 112 located therein. The end bell is provided with an aperture 114 located centrally within the recess having a plurality of lugs 116 formed integrally with the end bell projecting thereinto. The lugs are circumferentially spaced to define grooves 118 therebetween. Integrally formed heat dissipation fins 120 are formed on the interior surface of the end bell. A sealing surface 122 is provided on the exterior surface of the end bell peripherally of the recess.

A rectifier bridge assembly 108 is provided with a thermally and electrically conductive plate 124 having an annular recess or seat 126 machined therein. An O-ring seal 128 is sealingly fitted between the seat and the sealing surface 122. Interposed between the inner surface 130 of the plate and the outer surface 112 of the recessed end bell are three identical stacks 132. Each stack is comprised of semiconductive elements or pellets 134 and 136. Each of the semiconductive pellets is formed of a semiconductive crystal formed of a first region 138 of one conductivity type and a second region 140 of an opposite conductivity type. A junction 142 is formed at the intersection of the first and second regions within each semiconductive crystal. To improve the ability of the semiconductive crystals to withstand high blocking voltages they are shown beveled around their periphery, as is conventional practice. To protect the semiconductive crystals from contamination a passivant layer 144 is positioned around the periphery of each semiconductive crystal. The passivant layer is formed of a substantially impervious dielectric material having a high resistivity and high dielectric strength. It is preferred to utilize glass to form the passivant layer, although dielectrics, such as silicone rubbers, for example, may also be employed with a lesser degree of effectiveness. One major surface of the semiconductive element 134 in each stack lies in intimate thermally and electrically conductive relation with the conductive plate 124 while a second major surface of opposite conductivity type of the pellet 136 in each stack lies in intimate thermally and electrically conductive relation with a contact element 145, which may be a disc of a metal having a thermal coefficient of expansion which approximates that of the semiconductor crystal, such as tungsten or molybdenum, for example. The contact element forms a low impedance thermal and electrical interconnection between the semiconductor elements 136 and the outer surface of the recessed end bell.

In each stack interposed between the remaining major surfaces of the pellets 134 and 136 is an electrically conductive strip 146. A portion 148 of each strip extends inwardly through the aperture in the end bell of the alternator to form input terminals for the rectifier bridge assembly that cooperate with output leads of the alternator, not shown. A dielectric potting material 150, such as silicone, epoxy, or phenolic resin, surrounds and encapsulates the semiconductor elements and a portion of each strip 146. The contact elements protrude slightly from the encapsulant to assure that they securely engage the outer surface of the recess.

Fitted over the portions 148 of the strips is a lock coupler 152 having a plurality of lugs 154 peripherally formed thereon. The lugs 154 are sized to be smaller than the grooves 118 so that they can readily pass therethrough. Centrally formed in the coupler is a threaded sleeve 156. The threaded sleeve is aligned with a somewhat larger bore 158 in the plate and potting material. A mounting bolt 160 passes through the bore and is engaged with the threaded sleeve. An output lead 162 is pressed into engagement with the plate by the bolt.

It can be readily appreciated that the rectifier bridge assembly and alternator end bell may be easily constructed and assembled. The alternator end bell with the heat dissipation fins, recess, and aperture may be formed simply by known metal-casting techniques. The plate 124, semiconductive element 134, strip 146, semiconductive element 136, and contact element 145 may be formed as a stack by soldering the adjacent elements into engagement. Thereafter or alternatively the potting material 150 may be molded around the elements. The central bore 158 in the plate and potting material require no special mold configuration to form, since it may, if desired, be formed after the potting material is molded in place. The lock coupler 152 can be separately molded and thereafter slipped over the ends of the strips. The lock coupler 152 need not be permanently attached to the strips. Alternatively, the lock coupler may, if desired, be formed integrally with the potting material. The lugs 154 of the lock coupler may be reinforced, if desired. For example, reinforcing fingers may be joined to the threaded sleeve 156.

A very significant advantage of the rectifier bridge assembly and alternator as shown is that the rectifier assembly may be connected to the alternator after it is otherwise completely assembled. It is merely necessary to pass the lugs of the lock coupler through the grooves in the aperture of the end bell after the output leads of the alternator have been attached to the strips of the rectifier assembly. Then by turning the rectifier assembly overlie the lugs of the alternator end bell and inserting and tightening the bolt 160 the rectifier assembly is fully operational. If the lock coupler can be brought into position from the inside of the end bell of the alternator, as by attaching the rectifier assembly to the end bell before the end bell is attached to the alternator, there is no necessity of providing grooves in the aperture of the end bell and the lock coupler can be provided with an annular flange rather than lugs. Assembly of the rectifier bridge assembly is then simplified to the tightening of one bolt in order to both mount the assembly and connect the output electrical lead which carries the rectified electrical output for external use. It is, of course, recognized that the lock connector 152 and potting material 150 may be simultaneously cast with the rectifier bridge assembly in position on the end bell. In this circumstance the bolt 160 merely attaches the output lead, since the rectifier bridge assembly is permanently locked to the alternator end bell.

The electrical characteristics of the rectifier bridge assembly may be easily understood by reference to FIG. 1. The semiconductive pellets 134 and 136 in each stack act as rectifiers. The conductive strips 146 deliver a three-phase alternating current electrical input to the stacks between the pellets 134 and 136. Depending on the polarity of the input delivered to each stack, the input signal will either be conducted to the output lead 162 through the pellet 134 and the plate 124 or to ground through the pellet 136 and the alternator end bell 102, since the alternator housing is conventionally grounded. It is appreciated that the rectifier bridge assembly may be easily adapted for a single-phase input merely by omitting connection to one of the input terminals represented by strip portions 148 or by eliminating one stack entirely. With a high voltage application a plurality of rectifiers may be provided in series merely by doubling or tripling the number of semiconductive pellet means in each stack.

As is well understood in the art, when semiconductive elements are conducting current, they generate heat. Unless provision is made for conducting heat away from the semiconductive elements as quickly as it is generated they may be damaged by over heating. In the form shown the conductive plate 124 and end bell 102 act as heat sinks for the semiconductive pellets, since each pellet is provided with a major surface in low impedance electrical and thermal association with one plate. The remaining major surfaces of the pellets are in contact with the conductive strips 146 allowing an additional, although less efficient, heat dissipation path. The major portion of the generated heat is rejected from the rectifier bridge assembly through the alternator end bell. This eliminates the necessity of providing heat dissipation fins as a part of the rectifier bridge assembly, through such fins could be included if desired. The arrangement provided differs from conventional alternator bridge assemblies in that the bridge need not itself be provided with heat dissipation fins not is it essential that the location of the bridge be chosen to allow impingement of air directly on the rectifier bridge assembly.

It is a novel feature of our rectifier bridge assembly that heat is primarily rejected through the alternator housing. This then eliminates any necessity of mounting the rectifier bridge assembly for direct impingement by ambient air in order to achieve the desired level of cooling. Accordingly, the amount of contaminants that are brought into contact with the bridge assembly may be greatly reduced. This allows the further advantage that the degree of contaminant protection provided for the semiconductive crystals making up the pellets can be reduced with less risk of reliability. Or, alternately stated, comparable levels of reliability can be achieved with less contaminant protection. For example, it may be desirable to eliminate the potting material or to utilize a potting material less impervious to contaminants than has been used in the past. The O-ring seal may be omitted or may be replaced with a nonsealing electrically insulative spacer. Also, the passivant immediately surrounding the semiconductive elements may be omitted. Generally at least one of the O-ring seal, glass passivant, and potting material shown would be retained to protect the semiconductive elements. In the preferred form illustrated it is considered that the rectifier bridge assembly possesses a substantially greater level of protection against contamination of the semiconductive crystals making up the pellets than is afforded by rectifier constructions heretofore known to the art.

To illustrate the diversity of our invention, in FIGS. 5 and 6 a rectifier bridge subassembly 200 is illustrated. The subassembly includes a dielectric substrate 202 having angularly spaced ear portions 204 each provided with an aperture 206. An annular metal eye 208 is fitted into each aperture and provided with a rolled edge 210 at each end that overlies a conductive strip 212, which may be metallization printed onto the substrate. The conductive strips associated with each eye are located in opposed relation on opposite major surfaces of the substrate. Attached to each strip at a point remote from the aperture with which it is associated is a semiconductive element 214. The semiconductive elements each are provided with at least one rectifying junction. The semiconductive elements adjacent one major surface of the substrate are mounted with an N-type conductivity surface next adjacent the conductive strips, and the semiconductive elements adjacent the opposite major surface are mounted with a P-type conductivity surface next adjacent the conductive strips. The semiconductive elements may conveniently be soldered to the conductive strips by conventional techniques. Overlying the semiconductive elements so as to cover the remaining major surface thereof not contacting the strips are contact plates 216, which are preferably soldered to the semiconductive elements. A dielectric passivant material such as silicone rubber or glass seals the periphery of the semiconductive elements left exposed by the strips and contact plates. Each semiconductive element together with its associated dielectric passivant and contact plate forms a semiconductive pellet 219. A central aperture 220 is provided in the rectifier subassembly.

In FIG. 7 the rectifier subassembly is shown in a typical application. A thermally and electrically conductive member 222, which may be an alternator housing, is provided with at least one heat dissipation fin 224. The conductive member is provided with a threaded blind bore 226. A stud is threaded into the bore and is provided with a nut 230 fixed thereto. The fixed nut bears against a sandwich provided by the dielectric substrate and two flanking insulative washers 232 and 234. The fixed nut and stud hold the rectifier subassembly in position with the outer surface of the semiconductive pellets adjacent one major surface bearing against the inner surface of the conductive member 222 in thermally and electrically conductive relation. To supplement the dielectric passivant associated with the subassembly in protecting the semiconductive elements from contamination an O-ring seal 236 is interposed between the subassembly and the inner surface of the conductive member.

An annular housing 238 provided with a central insulative lining 240 is mounted on the stud to overlie the fixed nut and provide an insulative flange 242 in electrically conductive relation with the semiconductive pellets of the rectifier subassembly. An electrical output lead 244 is shown welded to the flange. A nut 246 is provided rotatably threaded to the stud to urge the annular housing into engagement with the rectifier subassembly. The alternating current input leads 248 for the rectifier bridge assembly are inserted into the eyes 208 of the subassembly. An O-ring seal 250 is interposed between the rectifier subassembly and the annular housing. While the construction of the modified rectifier bridge assembly of FIG. 7 differs substantially from that of FIGS. 2 through 4 inclusive, the function and advantages are similar.

FIG. 8 illustrates another modified form of our invention. An electrically conductive member 300, which may be an alternator housing portion, is provided with a plurality of apertures 302 and a threaded bore 304. A rectifier bridge assembly 306 is provided with an electrically and thermally conductive plate 308 provided on one major surface with heat dissipation fins 310. A plurality of stacks 312 are provided associated with the opposite major surface. The stacks may be identical in number and arrangement as in the rectifier bridge assembly 110. Similarly the potting material 314 surrounding the stacks is similar in configuration as in the bridge assembly 110. A major difference in construction between the bridge assembly 110 and bridge assembly 306 is that the latter bridge assembly is not provided with an electrically and thermally conductive plate interposed between the stacks and the adjacent mounting member. Thus in the bridge assembly 306 the stacks bear directly against the surface of the member 300. To protect the exposed major surface of the semiconductive pellets in the stacks that bear against the conductive member a thin metallized coating may be deposited over this major surface of the semiconductive pellets. Alternately a contact plate may be embedded in the potting material overlying each stack.

In another variation from the rectifier bridge assembly 110 the potting material is provided with an annular shoulder 316 protruding from the plate 308. A stud 318 extends through a bore 320 in the potting material and is threadedly engaged in the bore 304. A beveled washer 322, electrical output lead 324, and insulative washer 326 are interposed between the head of the stud and the plate 308, so that the electrical output lead is in conductive relation with the plate 308. The shoulder 316 and beveled washer are sized so that the desired compressive force is provided to hold the rectifier bridge assembly in engagement with the surface of the conductive member 300.

The rectifier bridge assembly 306 is essentially similar to rectifier bridge assembly 110 in operation, but offers several significant advantages in construction and assembly. The bridge assembly 306 can be easily mounted to the exterior surface of an alternator housing after the alternator is otherwise fully assembled. The exterior mounting allows the stud 318 to be quickly and conveniently positioned. The shoulder 316 offers the advantage of stopping the stud before excessive compressive force is placed on the bridge assembly. The bridge assembly 306 is significantly less costly than the bridge 110 by reason of the elimination of the plate interposed between the stacks and the surface of the alternator housing.

In FIGS. 9 and 10 a modified rectifier bridge assembly 400 is illustrated. As shown in FIG. 10 the rectifier bridge assembly is mounted on a thermally and electrically conductive member 402 having a plurality of heat dissipation fins 404. The member is provided with an aperture 404 within which an insulative bushing 406 having a flange 408 is fitted. A bolt 410 conductively associated with electrical output lead 412 is insulated from the member 402 by the bushing and is threadedly and conductively associated with a plate 414 of the rectifier bridge assembly. Offset from its point of connection to the bolt the plate is provided with an aperture 416. A plurality of stacks 418 are interposed between the conductive member 402 and the plate 414. The stacks are generally similar to those shown and described in connection with the preceding embodiments, except that the strips lying between the semiconductive elements of each stack differ somewhat in configuration. The strips 420a, 420b, and 420c are each somewhat differently configured, since the aperture 416 in the plate through which the strips pass is not positioned to allow a symmetrical arrangement about the center bolt, in the preceding embodiments. It is to be noted that the strip 420b traverses the distance between the aperture and stack in a circuitous manner to avoid intersection with the bolt. The stacks including all but the outer extremities of the strips are encapsulated by potting material 422. The potting material extends into and through the aperture 416 to insure insulation of the strips from the plate.

The operation of the rectifier bridge assembly 400 is generally similar to that of the preceding embodiments. It is to be noted that, again, the rectifier bridge assembly may be mounted and the output lead 412 attached by the single operation of inserting and tightening the bolt 410. Also, heat from the rectifier bridge assembly is still removed primarily through the conductive member 402.

In FIGS. 11 through 14 inclusive a more compact form of our invention is shown. Rectifier bridge assembly 500 is mounted in thermally and electrically conductive relation to member 502 by bolts 504. A significant distinction of the rectifier bridge assembly 500 is that the number of semiconductive elements is reduced from six in the other bridge assemblies disclosed to two. The bridge assembly is comprised of planar semiconductor discs 506 and 508. The disc 506 is formed generally of P type conductivity semiconductive material into which three radially arranged N type conductivity areas 510 have been formed. Each of the N type conductivity areas lie adjacent the inner major surface of the semiconductor disc, that is, the major surface next adjacent the disc 508. The semiconductive disc 508 is formed generally of N type conductivity semiconductive material into which three radially arranged P type conductivity areas 512 have been formed. The areas 510 and 512 are of similar geometric configuration and are aligned in the completed bridge assembly. Three separate contact members 514 are interposed between the spaced, parallel inner surfaces of the semiconductor discs. The contact members are of a geometrical configuration to provide a low impedance electrical contact to one N type conductivity area and one aligned P type conductivity area of the semiconductor discs 506 and 508, respectively. Each of the contact members are shown provided with an integrally formed tab 516 for connection to a three-phase alternating current source.

The tabs extend radially outwardly through a glass passivant ring 518 that protects the discs against contamination. It is to be noted that only a single glass passivant ring is required to protect both discs, whereas in the remaining rectifier bridge assemblies six separate glass passivant layers are provided to accomplish the same result. A thin thermally and electrically conductive layer 520 is noted to overlie and protect the outer major surface of the semiconductor disc 508. If it were desired to form the rectifier bridge assembly integrally with the member 502, this element could be omitted entirely. While a void is shown between the laterally spaced intact members 514, for high voltage applications a dielectric such as glass could be provided filling this void space.

To provide electrical contact to the outer major surface of the semiconductor disc 506 an electrically conductive member 522 is provided. A low impedance electrical connection exists between the conductive member 522 and the electrical output lead 524. To allow for mounting the bridge assembly an insulative plate 526 is provided. The plate may, for example, be a reinforced resin member molded around the conductive member 522 and output lead. In an alternate form the conductive member 522 may be constructed of heavier gauge metal and the insulative plate 526 eliminated. In this arrangement insulative bushings may be used to electrically isolate the bolts from the conductive members 522. It is appreciated that the plates 520 and 522, discs 506 and 508, glass passivant 518, and contact members 514 could be readily constructed as a unitary subassembly capable of performing in itself all the electrical functions of a rectifier bridge assembly.

The rectifier bridge assembly 500 functions similarly as the preceding rectifier bridge assemblies. It should be noted, however, that the construction of the rectifier bridge assembly is greatly simplified with the total number of elements required to form the rectifying function being greatly reduced.

While our rectifier bridge assembly has been specifically disclosed in connection with an alternator, it is appreciated that the bridge assembly may be mounted by other thermally and electrically conductive elements which are capable of serving both as a conduction path and a heat sink in association with the bridge assembly.

We claim:

1. The combination comprising:
    an alternator including an electrically and thermally conductive housing portion having one surface exposed for direct air cooling and a second surface opposed thereto and a plurality of output lead means for delivering alternating current;
    electrically conductive means spaced from said conductive housing portion of said alternator and having a first surface located in spaced parallel relation to said second surface of said conductive housing portion of said alternator;
    means interposed between said first and second surfaces for providing a separate unidirectionally conductive path from each of said output lead means to each of said first and second surfaces including;
    means adapted to be associated with each of said lead means for receiving an alternating electrical current therefrom;
    first and second semiconductive pellets separated by said receiving means and each containing layer portions of opposite conductivity type forming a rectifying junction therebetween;
    said first semiconductive pellets associated with each of said receiving means having a first conductivity type layer portion lying in thermally and ohmically conductive relation with said conductive housing portion of said alternator;
    said second semiconductive pellets associated with each of said receiving means having an opposite conductivity type layer portion lying in ohmically conductive relation with said first surface of said electrically conductive means,
    glass passivant means peripherally surrounding and bonded to each of said pellets; unitary dielectric bonding means peripherally surrounding all of said semiconductive pellets for protection thereof; and
    means electrically isolated from at least one of said first and second surfaces for mounting said electrically conductive means and said interposed means in assembled relation adjacent said conductive housing portion of said alternator.

2. The combination according to claim 1 in which said spaced electrically conductive means having a first surface includes an electrically and thermally conductive plate, a bolt is threaded to said alternator portion urging said plate into compressive association with said interposed means, an electrical output lead is urged into conductive engagement with said plate by said bolt, and means are provided for insulating said bolt from said plate and said electrical output lead.

3. The combination according to claim 1 in which said first surface providing means is provided with heat dissipation fins.

4. The combination comprising:
    a plurality of output lead means;
    an electrically and thermally conductive housing member exposed for direct air cooling having a recessed portion providing a first surface;
    a second electrically conductive member spaced from said recess member and providing a second surface;
    means located within the recess and interposed between said first and second surfaces for providing a separate unidirectionally conductive path from each of said output lead means to each of said first and second surface portions including;
    means for receiving an alternating electrical current;
    first and second semiconductive pellets separated by said receiving means and each containing layer portions of opposite conductivity type forming a rectifying junction therebetween;
    said first semiconductive pellets associated with each of said receiving means having a first conductivity type layer portion lying in thermally and ohmically conductive relation with said first surface of said recessed member;
    said second semiconductive pellets associated with each of said receiving means having an opposite conductivity type layer portion lying in ohmically conductive relation with said second surface of said second member; and
    dielectric passivant means peripherally bonded to and surrounding each of said semiconductive pellets and lying within the recess for protection thereof against contamination;
    means sealingly cooperating with said first and second members peripherally of the recess for electrically separating said members and for providing supplementary protection for said semiconductive pellets; and
    means electrically isolated from at least one of said first and second surfaces for mounting said members and said interposed means in assembled relation.

5. The combination according to claim 4 additionally including an aperture extending through one of said first and second members, a portion of each of said receiving means extending through the aperture, and means electrically insulating said receiving means from each other and from said one member.

6. The combination comprising:
    an alternator including an electrically and thermally conductive housing having an aperture therethrough defining grooves and lugs peripherally thereof, said housing defining a mounting surface surrounding the aperture;
    an electrically conductive plate including an opposed surface spaced from said alternator housing mounting surface having a bore therein aligned with the aperture;
    means interposed between said mounting and opposed surfaces including;
    a plurality of conductive strip means each including a first portion extending substantially parallel to said mounting and opposed surfaces and a second portion extending through the aperture;
    first and second semiconductive means associated with each of said strip means and each containing layer portions of opposite conductivity type forming a rectifying junction therebetween;
    each of said first semiconductive means including a first conductivity type layer portion ohmically and thermally conductively associated with said first portion of said strip means and a second conductivity type layer portion providing a major surface remote from said strip means lying in ohmically and thermally conductive relation with said mounting surface of said alternator housing;
    each of said second semiconductive means including a second conductivity type layer portion ohmically and thermally associated with said first portion of said strip means and a first conductivity type layer portion providing a major surface remote from said strip means lying in electrically conductive relation with said opposed surface of said electrically conductive plate;

an insulative lock coupler associated with said second portions of said strip means and carrying peripherally spaced lugs for overlying said lugs of said alternator housing, said lock coupler having a threaded aperture therein; and a mounting bolt extending through the bore of said electrically conductive plate and being threadedly engaged with the threaded aperture of said lock coupler to compressively urge said opposed surface toward said mounting surface and against said interposed semiconductive means.

7. The combination according to claim 6 additionally including lead means for conducting a rectified current interposed between said mounting bolt and said electrically conductive plate.